United States Patent [19]

Gutleber

[11] Patent Number: 4,494,228

[45] Date of Patent: * Jan. 15, 1985

[54] ORTHOGONAL CODE DIVISION MULTIPLE ACCESS COMMUNICATIONS SYSTEMS

[75] Inventor: Frank S. Gutleber, Little Silver, N.J.

[73] Assignee: The United States of America as represented by the Secretary of the Army, Washington, D.C.

[*] Notice: The portion of the term of this patent subsequent to Oct. 6, 1998 has been disclaimed.

[21] Appl. No.: 407,409

[22] Filed: Aug. 12, 1982

[51] Int. Cl.³ .......................... H03K 13/01; H04J 1/04
[52] U.S. Cl. ........................................ 370/18; 370/21; 375/96; 340/350
[58] Field of Search ................................... 370/18–22, 370/53, 69, 77, 85, 104, 116; 375/1, 25, 38, 96, 102–104, 2.2; 340/348, 349, 346, 350; 455/306; 364/604, 725, 728, 819, 826

[56] References Cited

U.S. PATENT DOCUMENTS 4,293,953 10/1981 Gutleber ............................. 375/25
4,301,530 11/1981 Gutleber ............................. 370/18

OTHER PUBLICATIONS

Weik, Martin H., *Communications Standard Dictionary*, Van Nostrand Reinhold Company, 1983, pp. 56, 200.

Primary Examiner—Jin F. Ng
Assistant Examiner—Albert W. Watkins
Attorney, Agent, or Firm—Anthony T. Lane; Robert P. Gibson; Jeremiah G. Murray

[57] ABSTRACT

An orthogonal code division multiple-access communications system comprised of a plurality of transceivers respectively employing orthogonal noise code mate pairs of a type having autocorrelation functions upon detection which when linearly added together compress into a lobeless impulse and wherein the same single time slot is utilized by all of the users in the system. Each user is assigned a different unique noise code pair consisting of code mate pairs that are selected from a subset of multiplexed noise codes whose cross-correlation function value is equal to zero at a time when all the code mate pairs compress to an impulse, i.e. $\tau=0$. The described arrangement enables random access, or direct call-up, to be accomplished with no interference between the users while using different noise codes for each user.

21 Claims, 4 Drawing Figures

ORTHOGONAL CODE DIVISION MULTIPLE ACCESS COMMUNICATIONS SYSTEMS

The invention described herein may be manufactured, used and licensed by or for the Government for Governmental purposes without the payment to me of any royalties thereon.

FIELD OF THE INVENTION

This invention relates generally to noise code communications systems and more particularly to an orthogonal code division multiple-access (CDMA) communications system which utilizes noise code mate pairs.

BACKGROUND OF THE INVENTION

Multiple-access communication systems utilizing noise coded signals are well known and are particularly desirable because they exhibit an immunity against self-interference and jamming. Noise coded means that the information is coded with a code that is "noise like" in that it will compress to an impulse upon autocorrelation. In particular, one class of noise codes are known wherein pairs of coded signals termed "code mates" have amplitudes and autocorrelation functions which provide a peak output at a given time and a zero output or outputs having the same magnitude but opposite polarity at all other times. When the code mates, for example, are multiplexed, matched filter detected and linearly added, there is provided a lobeless impulse output of a relatively high amplitude at a given time ($\tau = 0$) and a zero output at all other times. Such codes and systems utilizing such codes are typically shown and described in U.S. Pat. No. 3,461,451, entitled, "Code Generator To Produce Permutations Of Code Mates", which issued to F. S. Gutleber, the present inventor, on Aug. 12, 1969; U.S. Pat. No. 3,634,765, entitled, "System To Provide An Impulse Autocorrelation Function ... Of One Or More Of Said Code Signals", issued to F. S. Gutleber on Jan. 11, 1972; and U.S. Pat. No. 3,908,088, entitled, "Time Division Multiple Access Communications System", issued to F. S. Gutleber on Sept. 23, 1975. The teachings of these patents are herein meant to be incorporated specifically by reference. This application is also related to applicants co-pending application Ser. No. 402,476, filed July 28, 1982, entitled Multiplexed Noise Coded Switching System.

In a more recent patent by the subject inventor, identified as U.S. Pat. No. 4,301,530, entitled, "Orthogonal Spread Spectrum Time Division Multiple Accessing Mobile Subscriber Access System", which issued on Nov. 17, 1981, there is disclosed a system employing multiplexed noise codes of the type referred to above wherein a central node, or repeater, is utilized between a plurality of users desiring to communicate with one another with transmissions to the central node being performed at a first frequency and with retransmissions from the central node being performed at a second, different frequency; however, all the users employ the same code mate pairs but different available time slots within a channel frame period. The teachings of this patent are also meant to be incorporated herein by reference since it provides a basis for the subject invention which will be hereinafter described.

Furthermore, the utilization of different noise codes for a plurality of users, for example, in a mobile subscriber multiple-access system, normally results in non-orthogonal operation, meaning that self-interference is inherent in the system operation. Although each interfering signal is reduced by the time-bandwidth product, interfering users in close proximity are generally intolerable.

SUMMARY OF THE INVENTION

Accordingly, it is an object of the present invention to provide an improved noise coded communications system.

Another object of the present invention is to provide an improved noise code communications system employing code mate pairs having impulse autocorrelation functions.

Still another object of the present invention is to provide an improved noise code communications system utilizing multiplexed noise codes which operate with zero self-interference.

And yet another object of the present invention is to provide an orthogonal code division multiple-access noise code communications system wherein a different unique code is simultaneously utilized by each user in the system.

Accordingly, these and other objects are achieved in a code division multiple-access system utilizing orthogonal noise codes which compress to a lobeless impulse. Moreover, each user of the system is assigned a different unique noise code for operation in mutual time coincidence within the same single multi-bit time period and communication between the users occurs during one bit, i.e. the last or nth time bit of the period. Each noise code belongs to a particular set of multiplexed noise codes including subsets of code mate pairs where codes of the same orthogonal subset of the code mate pairs have a characteristic whereby the crosscorrelation between any two codes of the same subset is zero at a time $\tau = 0$, where $\tau = 0$ corresponds to the peak autocorrelation function value of the desired signal. Such codes are of particular applicability in a mobile subscriber access system for a plurality of users which transmit to a central node at a first frequency which retransmits therefrom to the intended recipient at a second frequency. A loopback synchronous timing scheme, moreover, is employed to maintain a time reference for all of the users so as to keep the system orthogonal and insure reception only to the intended transmissions with total noninterference between adjacent users. Although spurious lobes exist whose average (rms) value has an amplitude that is down by at least the square root of the code sequence length (n) which corresponds to the time-bandwidth product, the absence of any crosscorrelation value in the same time slot for all the codes enables the implementation of a synchronously timed system that operates orthogonally, i.e. with zero self interference.

DETAILED DESCRIPTION OF THE PREFERRED EMBODIMENT

Figure 1:
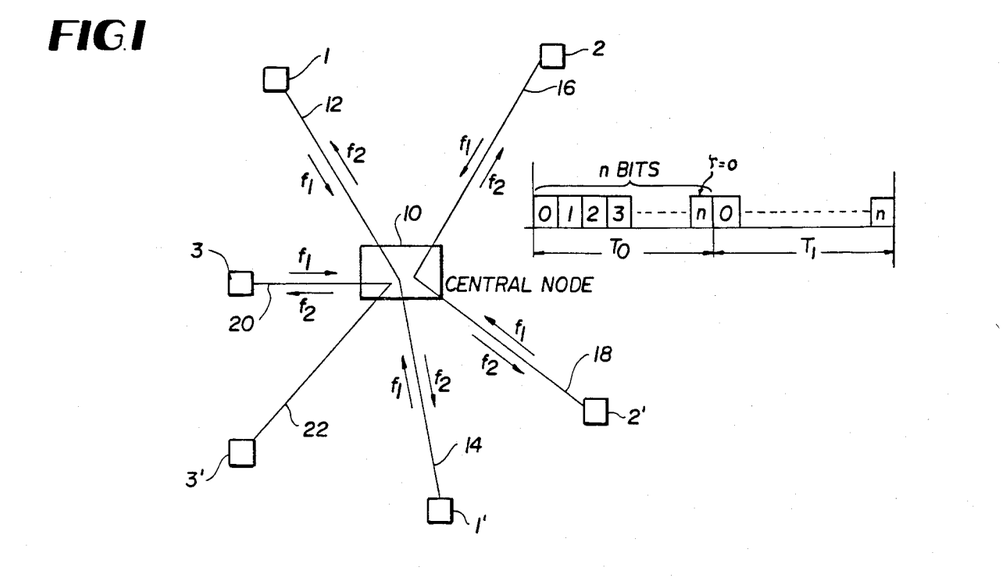
FIG. 1 is a simplified illustration of a ground mobile access system employing orthogonal code division multiple accessing according to the present invention.

Referring now to the drawings and more particularly to FIG. 1, there is illustrated a multiple-access system such as a mobile subscriber access system employing code division multiple access (CDMA). This arrangement is similar to the mobile subscriber access system employing time division multiple accessing as shown and described in the above referenced U.S. Pat. No. 4,301,530, inasmuch as the various users 1, 1', 2,2', 3 and 3' communicate with one another through a central node or repeater 10. Whereas various users in the system of U.S. Pat. No. 4,301,530 employ the same multiplexed noise code, each user communicated with another designated user during different available time periods or slots $T_0, T_1, T_2 \ldots T_n$ of a predetermined channel time frame. In the subject invention, however, each user is assigned and communicates to another user, for example users 1 and 1' via a different noise code of n bits which arrives at a common central node 10 synchronously with all other users during the same single available time slot, $T_0$. Thus in the prior art the same code was utilized which resulted in time division multiple-access (TDMA) operation whereas in the present invention different codes are utilized by each user in the same time slot which results in code division multiple-access or simply CDMA operation. Communicating via the central node 10 provides a common time reference for achieving a synchronously timed system. Communications between all of the users occurs during the nth time bit as received at the central node 10. The nth bit, moreover, corresponds to a common time ($\tau=0$) where the autocorrelation functions of each user's code pair compresses to a lobeless impulse. Moreover, as will be shown, the different user's noise codes also crosscorrelate to zero at this time and comprise the type of codes utilized.

Where, for example, the intended application is for a ground mobile access system, omnidirectional antennas would typically be used. This would normally result in self-interference between the users over direct paths, since only the synchronized access signals emanating from the central node 10 are rendered totally non-interfering. In order to retain the system orthogonal, all the transmissions from the various users to the central node 10 are in one frequency band $f_1$, and those from the central node to the mobile users are in a different frequency band $f_2$. This causes the mobile users to only be receptive to transmissions from the central node which then provides a space time reference for all the users 1 through 3'. The various accessing signals are kept locked in timed relationship using a loopback synchronous timing scheme as shown in FIG. 2.

Figure 2:
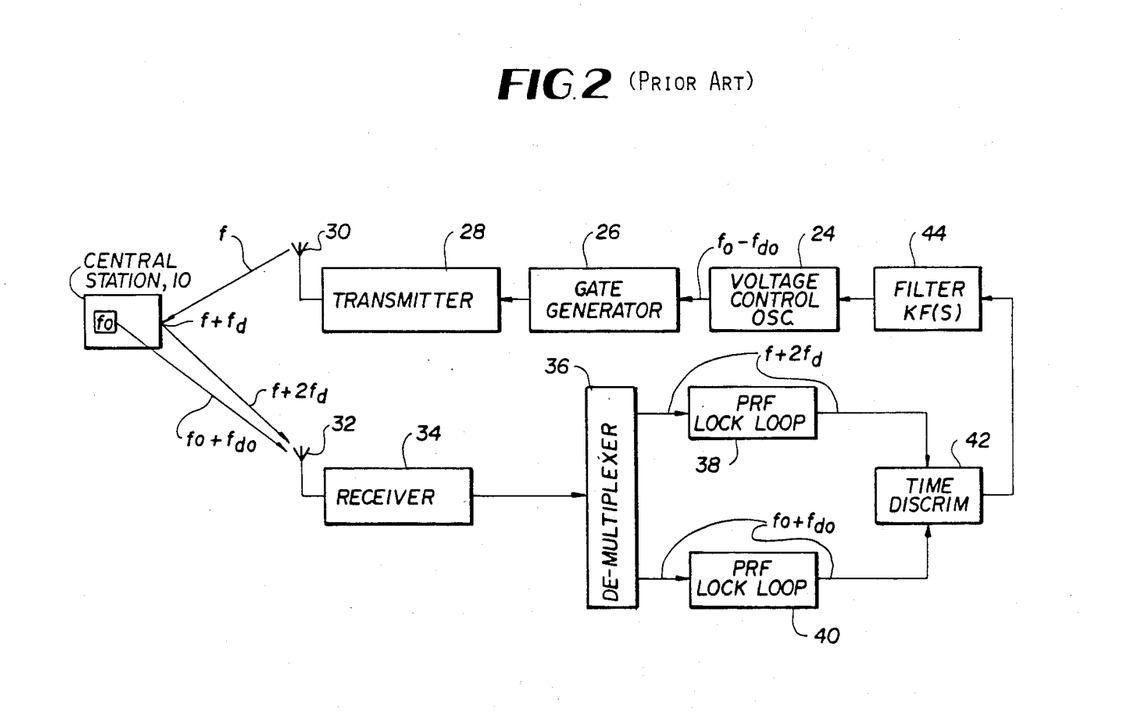
FIG. 2 is a functional block diagram illustrative of the loopback synchronous timing control which maintains the various channels in the central node retransmissions time synchronous.

Referring now to FIG. 2, timing signals generated by a voltage controlled oscillator 24 are coupled by a gate generator 26 to a transmitter 28 for radiation from antenna 30, at a frequency f, towards the central station 10. The central station 10 receives the transmission with a Doppler shift $f_d$, i.e. $f+f_d$ which retransmits such signal to the receiving antenna 32 with a frequency shift equal to twice the Doppler frequency or $2f_d$. Simultaneously, the central station transmits a clock standard prf frequency of $f_0+f_{d0}$. The two signals $(f+2f_d)$ and $(f_0+f_{d0})$ are coupled from the receiving antenna 32 to a receiver 34 and a demultiplexer 36. The demultiplexer 36 is coupled to a pair of prf lock loop circuits 38 and 40 whose outputs are coupled to a time discriminator 42 for providing a comparison of the phase or time of signal $f+2f_d$ against the clock standard prf frequency $f_0+f_{d0}$ which are simultaneously received from the central node 10. The output of the time discriminator 42 is coupled back to the voltage controlled oscillator 24 by means of a filter 44 which will cause the output of the voltage controlled oscillator 24 to change until its frequency output is equal to $f_0-f_{d0}$, at which point a locked condition occurs. In this state, the frequency of all the users, 1, 1', 2,2', 3 and 3' would arrive at the central node 10 with the synchronous frequency equal to $f_0$ and each noise coded signal can be positioned to arrive at the central node 10 during the same time period $T_0$.

When the transmission loop is locked, the output of the time discriminator 42 is zero and $$f+2f_d=f_0+f_{d0} \tag{1}$$

Since the path to and from the central node 10 is the same, $$f_d=f_{d0} \tag{2}$$

Therefore, $$f=f_0-f_{d0} \tag{3}$$

Thus, the signal frequency received from each mobile user at the central node 10 is, $$f+f_d=f_0-f_{d0}=f_0 \tag{4}$$

While in the system of the subject invention all of the different noise codes arrive and are retransmitted during the same time, they are of a predetermined type which are rendered non-interfering when pulse compressed, for example, by being detected with a matched filter and gated. The particular type of noise codes comprise a sub-class of multiplexed noise codes formed with code mate pairs that compress to a lobeless impulse and as such are formed from code mate pairs of the type shown and described, for example, in the aforementioned U.S. Pat. Nos. 3,461,451 and 3,634,765. The specific sub-class of noise codes required for operation of the system shown in FIG. 2 requires that the noise code mate pairs of the same subset have a crosscorrelation value equal to zero at a point in time where the autocorrelation between code mates compress to a lobeless impulse i.e. at $\tau=0$.

With respect to the first condition, multiplexed noise codes comprising code mate pairs that compress to an impulse correlation function which is to say that they compress to a single impulse containing no side lobes. This is achieved by utilizing code mate pairs that meet the following conditions, namely that the autocorrelation function of the two codes forming a mate pair must be of equal magnitude and opposite sense for all values of time outside of the main lobe. Expressed mathematically for two code mate pairs a and b, $$\phi_a(\tau)=-\phi_b(\tau) \tag{5}$$

for all $\tau \neq 0$ where $\phi_a(\tau)$ = the autocorrelation function of code a and $\phi_b(\tau)$ = autocorrelation function of code b.

When the two codes meet this requirement, then the simple linear sum of their orthogonally multiplexed and detected outputs by means of a matched filter, for example, results in compressing the composite code structure into a single impulse.

Figure 3:
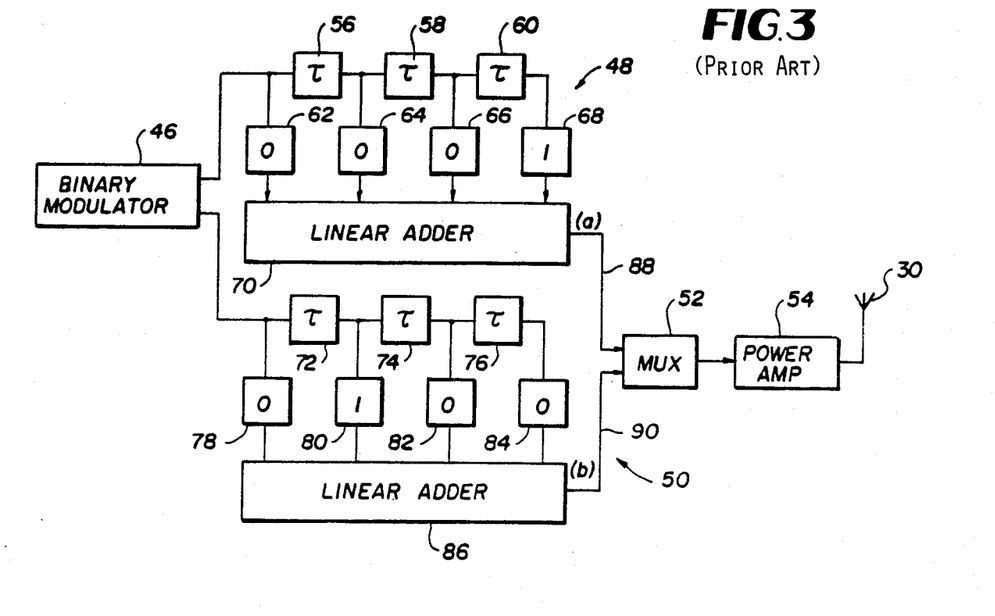
FIG. 3 is a functional block diagram of the transmitter portion of a communications system for use with a multiplexed code pair constructed according to the subject invention.
Figure 4:
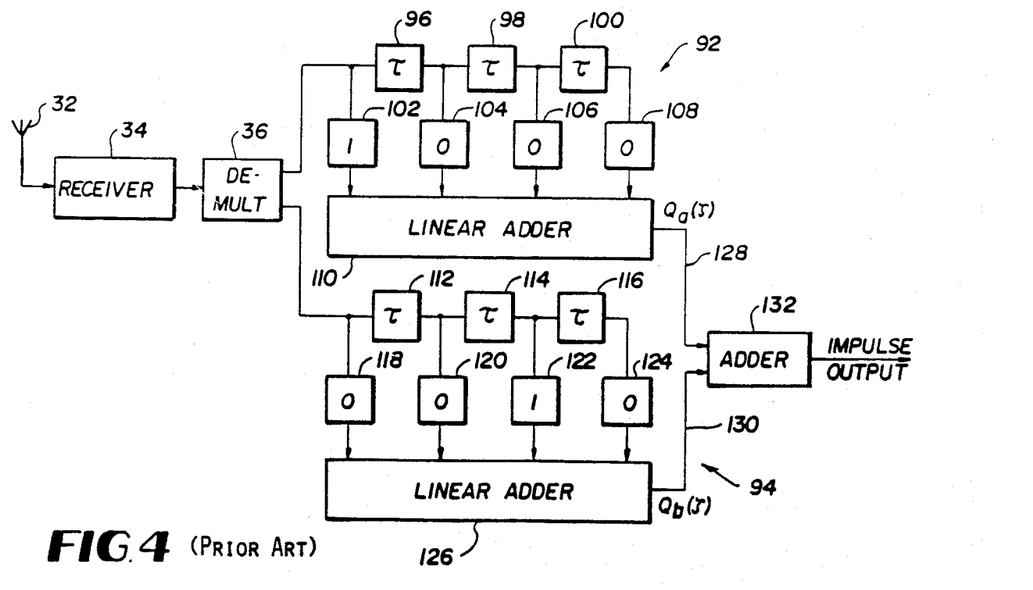
FIG. 4 is a functional block diagram of the receiver portion of a communications system for use with a multiplexed code pair utilized by the transmitter shown in FIG. 3.

Apparatus for implementing a system such as shown in FIGS. 1 and 2 utilizing code mate pairs is shown in FIGS. 3 and 4, and which are utilized in the transmitter and receiver portions, respectively. Referring now to FIG. 3, the gate generator 26 of the transmitter 28 of FIG. 2 is replaced by the binary modulator 46, a pair of binary multi-bit code generators 48 and 50, a multiplexer 52, and a power amplifier 54. The code generators 48 and 50 are adapted to generate noise code mate pairs which meet the above stated autocorrelation function requirements and for which:

code (a) = 0001 code (b) = 0100 where 0 indicates a plus (+) polarity signal of unit amplitude, 1 indicates a minus (−) polarity signal of unit amplitude, Code (a) is generated by means of time delay circuits 56, 58 and 60 as well as four phase control circuits 62, 64, 66 and 68 which couple to a linear adder 70. The "1" or "0" associated with these phase control circuits signify a phase operation where 1 signifies a phase reversal while 0 signifies no phase reversal. The time delay circuits 56, 58 and 60 are adapted to provide a time delay ($\tau$) of one bit for a multi-bit code whereas the phase control circuits 62, 64 and 66 are adapted to provide a signal feedthrough of 0° phase reversal whereas phase control circuit 68 provides 180° phase shift. In a like manner, the code generator 50 is comprised of three time delay circuits 72, 74 and 76 as well as the phase controlled circuits 78, 80, 82 and 84 which couple to the linear adder 86. What is significant about the code generator 50 with respect to code generator 48 is the phase relationship of phase control circuits. As is seen, the phase control circuits 78, 82 and 84 provide a 0° phase shift while the second phase shift circuit 80 provides a 180° phase shift. Both codes (a) and (b) are fed to the multiplexer 52 via respective data lines 88 and 90 where they are propagated from antenna 30 and received by the antenna 32 shown in FIG. 4, which is located, for example, at the central node 10 which also includes the receiver 34 and the demultiplexer 36.

The output of the demultiplexer 36 feeds to the pair of matched filters 92 and 94 which are similar to the code generators 48 and 50 with the exception that the phase control circuits provide the inverse of codes (a) and (b) so that the phase reversals match the input code sequence in reverse order. As can be seen, the matched filter 92 includes three bit time delay circuits 96, 98 and 100 along with phase control circuits 102, 104, 106 and 108 which feed to a linear adder 110. In this instance, the phase control circuit 102 provides 180° phase shift whereas the remaining three phase control circuits 104, 106 and 108 provide a 0° phase shift. With respect to matched filter 94, it includes three time delay circuits 112, 114 and 116 together with the phase control circuits 118, 120, 122 and 124 which couple into the linear adder 126. Whereas the second phase control circuit 80 in FIG. 3 provides 180° phase shift in the matched filter 94 the third phase control circuit 122 provides 180° phase shift while the second phase control circuit 120 provides a 0° phase shift. The two matched filters 92 and 94 accordingly provide autocorrelation outputs of $\phi_a(\tau)$ and $\phi_b(\tau)$ on data lines 128 and 130. The operation of the two matched filters 92 and 94 for codes (a) and code (b) can be graphically shown as follows.

For code (a) = 0001 inputted to matched filter 92 which provides an inversion sequence of 1000, a compressed code output $\phi_a(\tau)$ from adder 110 is provided as,

| bit time slot | 1 | 2 | 3 | 4 | 5 | 6 | 7 |
|---|---|---|---|---|---|---|---|
| output of 102 | 1 | 1 | 1 | 0 | | | |
| output of 104 | | 0 | 0 | 0 | 1 | | |
| output of 106 | | | 0 | 0 | 0 | 1 | |
| output of 108 | | | | 0 | 0 | 0 | 1 |
| output of 110 | 1 | • | 0 | $0^4$ | 0 | • | 1 = $\phi_a(\tau)$ |

$\uparrow \tau = 0$

Note that $\tau = 0$ occurs where there is a time coincidence or zero time delay for the binary bits in bit time slot #4. Also the exponent represents the amplitude of the positive polarity signal while the dot represents a zero amplitude.

For code (b) = 0100 inputted to matched filter 94, which provides an inversion sequence of 0010, code compression proceeds in the following manner,

| bit time slot | 1 | 2 | 3 | 4 | 5 | 6 | 7 |
|---|---|---|---|---|---|---|---|
| output of 118 | 0 | 1 | 0 | 0 | | | |
| output of 120 | | 0 | 1 | 0 | 0 | | |
| output of 122 | | | 1 | 0 | 1 | 1 | |
| output of 124 | | | | 0 | 1 | 0 | 0 |
| output of 126 | 0 | • | 1 | $0^4$ | 1 | • | 0 = $\phi_b(\tau)$ |

$\uparrow \tau = 0$

And the linear sum $\phi_T(\tau)$ of the two compressed codes $\phi_a(\tau)$ and $\phi_b(\tau)$ as graphically illustrated below becomes

| bit time slot | 1 | 2 | 3 | 4 | 5 | 6 | 7 |
|---|---|---|---|---|---|---|---|
| $\phi_a(\tau)$ | 1 | • | 0 | $0^4$ | 0 | • | 1 |
| $\phi_b(\tau)$ | 0 | • | 1 | $0^4$ | 1 | • | 0 |
| $\phi_T(\tau)$ | • | • | • | $0^8$ | • | • | • |

$\uparrow \tau = 0$

Thus the composite output from adder 132 comprises a lobeless impulse ($0^8$) at bit time slot #4 where $\tau = 0$ when code mate pairs satisfying equation (5) are utilized.

While the subject invention utilizes noise codes in the form of code mate pairs as illustrated above, there also exists a sub-class of the type of codes which exhibit a characteristic where code mates of the same subset of two subsets making up a set of code mate pairs have a crosscorrelation value of zero at $\tau = 0$. When this condition is met, multiple users utilizing mutually different multiplexed noise codes comprised of noise code mate pairs satisfying the second criteria can be utilized coincidentally in time, i.e. in the same time period, for example $T_0$ of FIG. 1 without interference from adjacent users. The following tables are illustrative of four bit and eight bit sets of code mate pairs which satisfy the last stated condition.

TABLE I

| Code Pair No. | Code (a) Subset | Code (b) Subset |
|---|---|---|
| 1 | 1 0 0 0 | 1 0 1 1 |
| 2 | 0 0 1 0 | 1 1 1 0 |
| 3 | 0 1 0 0 | 0 1 1 1 |
| 4 | 0 0 0 1 | 1 1 0 1 |
| 5 | 1 0 0 0 | 0 1 0 0 |
| 6 | 0 0 1 0 | 0 0 0 1 |
| 7 | 0 1 0 0 | 1 0 0 0 |
| 8 | 0 0 0 1 | 0 0 1 0 |

TABLE II

| Code Pair No. | Code (a) Subset | Code (b) Subset |
|---|---|---|
| 1 | 1 0 1 0 0 0 1 1 | 1 0 0 1 0 0 0 0 |
| 2 | 1 0 0 0 0 1 0 0 | 1 0 0 0 1 0 1 1 |
| 3 | 0 1 0 0 1 0 0 0 | 1 0 1 1 1 0 0 0 |
| 4 | 0 0 0 1 0 0 1 0 | 0 0 0 1 1 1 0 1 |
| 5 | 1 1 0 1 0 0 0 1 | 1 1 0 1 1 1 1 0 |
| 6 | 1 1 1 1 0 1 1 0 | 0 0 1 1 1 0 1 0 |
| 7 | 0 1 0 0 0 1 1 1 | 0 1 0 0 1 0 0 0 |
| 8 | 0 1 1 1 0 1 0 0 | 1 0 0 0 0 1 0 0 |
| 9 | 0 1 1 1 1 0 1 1 | 1 0 0 0 1 0 1 1 |
| 10 | 1 1 1 0 1 1 0 1 | 0 0 0 1 1 1 0 1 |
| 11 | 0 0 1 0 1 1 1 0 | 1 1 0 1 1 1 1 0 |
| 12 | 1 0 1 1 1 0 0 0 | 0 1 0 0 1 0 0 0 |

In order to demonstrate the crosscorrelation aspect of the invention utilizing, for example, code mate pairs such as shown in Tables I and II, the following explanation will render this characteristic immediately evident.

The crosscorrelation function of the same subsets for code pairs 2 and 1 of code (a) and code (b) of Table I at $\tau=0$ is readily determined as follows:

For code (a), $$\Sigma \begin{array}{c} 1\ 0\ 0\ 0 \\ \times\ 0\ 0\ 1\ 0 \\ \hline =\ -\ +\ -\ + \end{array} = 0 = \phi_{a_2\,a_1}(0)$$

For code (b), $$\Sigma \begin{array}{c} 1\ 0\ 1\ 1 \\ \times\ 1\ 1\ 0\ 1 \\ \hline =\ +\ -\ -\ + \end{array} = 0 = \phi_{b_2\,b_1}(0)$$

and, $$\phi_{21}(0) = \phi_{a_2\,a_1}(0) + \phi_{b_2\,b_1}(0)$$
$$= 0 + 0 = 0$$

Where $\phi_{a_2\,a_1}(0) =$ crosscorrelation function value between codes $a_2$ and $a_1$ at $\tau = 0$ $\phi_{b_2\,b_1}(0) =$ crosscorrelation function value between codes $b_1$ and $b_2$ at $\tau = 0$ $\phi_{21}(0) =$ total crosscorrelation function value between multiplexed code pairs 2 and 1 at $\tau = 0$ and $1 \times 0 = -$
$0 \times 1 = -$
$1 \times 1 = +$
$0 \times 0 = +$ The crosscorrelation function value at $\tau=0$ for all 28 possible combinations of the code presented in Table I is shown in Appendix A appearing at the end of the specification which verifies that the crosscorrelation value between any two or more code pairs of the same subset is zero and accordingly the codes are orthogonal or totally non-interfering at $\tau=0$.

For further clarification, in an application where, for example, eight different users are communicating at the same time $T_0$ with each user employing a different code pair of the set as Table I, for the user #1 employing code pair No. 1, i.e. 1000 and 1011 the potential interference of code pair Nos. 2 through 8 would be as follows.

The input to a receiver having a matched filter for code pair No. 1 would be:

Code (a) matched filter would see as an input $\Sigma_{a1}$ which is graphically illustrated as:

| | | | | |
|---|---|---|---|---|
| from user #2 | 0 | 0 | 1 | 0 |
| from user #3 | 0 | 1 | 0 | 0 |
| from user #4 | 0 | 0 | 0 | 1 |
| from user #5 | 1 | 0 | 0 | 0 |
| from user #6 | 0 | 0 | 1 | 0 |
| from user #7 | 0 | 1 | 0 | 0 |
| from user #8 | 0 | 0 | 0 | 1 |
| $\Sigma a_1 =$ | $0^5$ | $0^3$ | $0^3$ | $0^3$ |

Code (b) matched filter input would see $\Sigma_{b1}$ graphically illustrated as,

| | | | | |
|---|---|---|---|---|
| from user #2 | 1 | 1 | 1 | 0 |
| from user #3 | 0 | 1 | 1 | 1 |
| from user #4 | 1 | 1 | 0 | 1 |
| from user #5 | 0 | 1 | 0 | 0 |
| from user #6 | 0 | 0 | 0 | 1 |
| from user #7 | 1 | 0 | 0 | 0 |
| from user #8 | 0 | 0 | 1 | 0 |
| $\Sigma b_1 =$ | 0 | 1 | 0 | 0 | where the exponent indicates the amplitude and
0 = positive (+) polarity signal
1 = negative (−) polarity signal The outputs $\phi_{a1}(\tau)$ and $\phi_{b1}(\tau)$ of the matched filters for user #1 employing code pair No. 1 would be as follows:

Code (a) matched filter providing an inversion sequence of 0001 would output $\phi_{a1}(\tau)$ according to the following graphic illustration:

Code (b) matched filter providing an inversion sequence of 1101 would output $\phi_{b1}(\tau)$ according to,

| 1 | 0 | 1 | 1 |

-continued $$\phi_{b1}(\tau) = \begin{array}{cccccccc} & & 1 & 0 & 1 & 1 & & \\ & & 0 & 1 & 0 & 0 & & \\ & & & 1 & 0 & 1 & 1 & \\ \hline 1 & \bullet & 0 & 1^4 & 0 & \bullet & 1 \end{array}$$

$$\uparrow \tau = 0$$

And the composite summed output $\phi_T(\tau)$ would result in $$\phi_T(\tau) = \begin{array}{ccccccccc} 0^5 & 0^8 & 0^{11} & 0^4 & 0^3 & \bullet & & 1^3 \\ 1 & \bullet & 0 & 1^4 & 0 & \bullet & & 1 \\ 0^4 & 0^8 & 0^{12} & \bullet & 0^4 & \bullet & & 1^4 \end{array}$$

$$\uparrow \tau = 0$$

The center or fourth bit time slot corresponds to $\tau=0$ and is where all other users of the system would be totally non-interfering since zero amplitude exists thereat. The desired signal of user #1 on the other hand would simply linearly sum with the total input and compress to its peak value at $\tau=0$. The interfering energy that is present in the lobes of the compressed signal is simply gated out or it causes no interference at all. It is important to note that although this illustrated example used the same amplitude for each interfering pair, the actual amplitudes could all be different and theoretically have any value with the same result. Therefore there would be no near/far ratio interference problem present in the system of the subject invention. That is, it would operate as a true orthogonal noise coded multiple-access system even though each user is utilizing his own different unique noise code.

A similar exercise for the code set of Table II would reveal identical results. Rather than present the crosscorrelation function values for all of the sixty-six possible combinations, however, one typical sample situation will be illustrated. This will suffice to demonstrate and clarify that this 8 bit code set can indeed operate as an orthogonal system.

With reference to Table II, consider code mate pair Nos. 5 and 7 existing simultaneously with code pair No. 4 by respective numbered users. The inputs to the matched filter of the receiver of the user #4 who is utilizing code pair No. 4 is then:

The code (a) matched filter input of user #4 would see $\Sigma_{a4}$ graphically illustrated as,

| from user #5 | 1 | 1 | 0 | 1 | 0 | 0 | 0 | 1 |
|---|---|---|---|---|---|---|---|---|
| from user #7 | 0 | 1 | 0 | 0 | 0 | 1 | 1 | 1 |
| $\Sigma_{a4}$ = | . | $1^2$ | $0^2$ | . | $0^2$ | . | . | $1^2$ |

Code (b) matched filter input of user #4 would see $\Sigma_{b4}$ illustrated below as,

| from user #5 | 1 | 1 | 0 | 1 | 1 | 1 | 1 | 0 |
|---|---|---|---|---|---|---|---|---|
| from user #7 | 0 | 1 | 0 | 0 | 1 | 0 | 0 | 0 |
| $\Sigma_{b4}$ = | . | $1^2$ | . | $1^2$ | . | . | $0^2$ | |

And the output $\phi_{a4}(\tau)$ and $\phi_{b4}(\tau)$ of the matched filters for user #4 providing inversion sequences of 01001000 and 10111000, respectively, would be:

Code (a) matched filter would output $\phi_{a4}(\tau)$ according to $$\theta_{a4}(\tau) = \begin{array}{cccccccccccc} 1^2 & 0^2 & & 0^2 & & & & 1^2 & & & & \\ & 0^2 & 1^2 & & 1^2 & & & & 0^2 & & & \\ & & 1^2 & 0^2 & & 0^2 & & & & 1^2 & & \\ & & & 1^2 & 0^2 & & 0^2 & & & & 1^2 & \\ & & & & 0^2 & 1^2 & & 1^2 & & & 0^2 & \\ & & & & & 1^2 & 0^2 & & 0^2 & & & 1^2 \\ & & & & & & 1^2 & 0^2 & & 0^2 & & 1^2 \\ & & & & & & & 1^2 & 0^2 & & 0^2 & . & 1^2 \\ \hline 1^2 & 0^4 & 1^4 & 0^2 & 0^2 & 1^2 & . & . & 0^2 & . & 0^4 & 1^2 & 1^2 & 1^2 \end{array}$$

and code (b) matched filter would output $\phi_{b4}(\tau)$ according to $$\theta_{a4}(\tau) = \begin{array}{cccccccccccc} 0^2 & 1^2 & & 0^2 & & & 1^2 & & & & & \\ & 1^2 & 0^2 & & 1^2 & & & 0^2 & & & & \\ & & 0^2 & 1^2 & & 0^2 & & & 1^2 & & & \\ & & & 0^2 & 1^2 & & 0^2 & & & 1^2 & & \\ & & & & 0^2 & 1^2 & & 0^2 & & & 1^2 & \\ & & & & & 1^2 & 0^2 & & 1^2 & & & 0^2 \\ & & & & & & 1^2 & 0^2 & & 1^2 & & 0^2 \\ & & & & & & & 1^2 & 0^2 & & 1^2 & . & 0^2 \\ \hline 0^2 & 1^4 & 0^4 & 0^2 & 1^2 & 1^2 & . & 0^4 & 1^2 & 1^4 & 1^4 & 0^2 & 0^2 & 0^2 \end{array}$$

And the composite summed output $\phi_{T4}(\tau)$ of the filter matched to code pair No. 4 would be $$\phi_{T4}(\tau) = \begin{array}{cccccccccccccc} 1^2 & 0^4 & 1^4 & 0^2 & 0^2 & 1^2 & \bullet & \bullet & 0^2 & \bullet & 0^4 & 1^2 & 1^2 & 1^2 \\ 0^2 & 1^4 & 0^4 & 0^2 & 1^2 & 1^2 & \bullet & 0^4 & 1^2 & 1^4 & 1^4 & 0^2 & 0^2 & 0^2 \\ \bullet & \bullet & \bullet & 0^4 & \bullet & 1^4 & \bullet & 0^4 & \bullet & 1^4 & \bullet & \bullet & \bullet & \bullet \end{array}$$

$$\uparrow \tau = 0$$

which verifies that there would be no interference from the simultaneous presence of code pairs 5 and 7 against code pair number 4.

Thus what has been shown and described is an orthogonal code division multiple-access communications system comprised of a plurality of transceivers each of which includes means for generating and detecting first and second voice coded signals forming a code mate pair wherein all of the first noise coded signals are orthogonal, i.e. mutually non-interfering, with respect to all the second noise coded signals, wherein all of the noise coded signals have an autocorrelation function which compresses to an impulse at a common time with the autocorrelation function of the first noise coded signals being substantially equal and opposite to the autocorrelation function of the corresponding second noise coded signal at times other than the common time, and wherein each of the first noise coded signals have crosscorrelation functions with respect to all other first noise coded signals that is equal and opposite to the crosscorrelation function of the corresponding second noise coded signals with respect to all other corresponding second noise coded signals at the common time.

This results in an orthogonal system whereby all the transceivers can selectively communicate using mutually different noise codes without undesirable interference from the other transceivers. Further by saying that the noise coded signals have an autocorrelation function which compresses to an impulse at a common time means that all of the autocorrelation impulses for the "a" and "b" codes occurs at the same time i.e. $\tau=0$ and when the codes are respectively autocorrelated, for example, in a matched filter, they compress to an impulse with sidelobes; however, by also saying that the autocorrelation function of the first noise coded signal, e.g. code $a_i$, is substantially equal to and opposite the autocorrelation function of the corresponding second noise coded signal e.g. code $b_i$ at all times other than the common time $\tau=0$, the resultant or composite signal upon linear addition comprises an impulse type signal with no sidelobes.

Additionally by saying that each of the first noise coded signals e.g. $a_i$ have crosscorrelation functions with respect to all other first noise code signals $a_1 \ldots a_{i-1}$ and $a_{i+1} \ldots a_n$ that is equal and opposite to the crosscorrelation function of the corresponding second noise coded signal e.g. $b_i$ with respect to all other corresponding second noise coded signals $b_1 \ldots b_{i-1}$ and $b_{i+1} \ldots b_n$ at the common time means that all of the "a" codes crosscorrelate with each other such that their value is equal and opposite to the crosscorrelation value of the corresponding "b" codes at $\tau=0$. The resultant signal after linear adding the equal and opposite values is a zero amplitude signal at $\tau=0$. Accordingly any crosscorrelation value of a noise coded signal $a_i$ with any other a code signal will be cancelled by the corresponding crosscorrelation values of the corresponding b code signals.

Having shown and described what is at present considered to be the preferred embodiment of the invention, it should be understood that the same has been made by way of illustration and not of limitation and accordingly all modifications, alterations and changes coming within the spirit and scope of the invention as defined in the following claims, are herein meant to be included.

APPENDIX A $$\begin{array}{c} 1\ 0\ 0\ 0 \\ 0\ 1\ 0\ 0 \\ \hline -\ -\ +\ + \end{array} \oplus \begin{array}{c} 1\ 0\ 1\ 1 \\ 1\ 1\ 1\ 0 \\ \hline +\ -\ +\ - \end{array} = 0 = \phi_{31}(0)$$

$$\begin{array}{c} 1\ 0\ 0\ 0 \\ 0\ 0\ 0\ 1 \\ \hline -\ +\ +\ - \end{array} \oplus \begin{array}{c} 1\ 0\ 1\ 1 \\ 1\ 1\ 0\ 1 \\ \hline +\ -\ -\ + \end{array} = 0 = \phi_{41}(0)$$

$$\begin{array}{c} 1\ 0\ 0\ 0 \\ 1\ 0\ 0\ 0 \\ \hline +\ +\ +\ + \end{array} \oplus \begin{array}{c} 1\ 0\ 1\ 1 \\ 0\ 1\ 0\ 0 \\ \hline -\ -\ -\ - \end{array} = 0 = \phi_{51}(0)$$

$$\begin{array}{c} 1\ 0\ 0\ 0 \\ 0\ 0\ 1\ 0 \\ \hline -\ +\ -\ + \end{array} \oplus \begin{array}{c} 1\ 0\ 1\ 1 \\ 0\ 0\ 0\ 1 \\ \hline -\ +\ -\ + \end{array} = 0 = \phi_{61}(0)$$

$$\begin{array}{c} 1\ 0\ 0\ 0 \\ 0\ 1\ 0\ 0 \\ \hline -\ -\ +\ + \end{array} \oplus \begin{array}{c} 1\ 0\ 1\ 1 \\ 1\ 0\ 0\ 0 \\ \hline +\ +\ -\ - \end{array} = 0 = \phi_{71}(0)$$

$$\begin{array}{c} 1\ 0\ 0\ 0 \\ 0\ 0\ 0\ 1 \\ \hline -\ +\ +\ - \end{array} \oplus \begin{array}{c} 1\ 0\ 1\ 1 \\ 0\ 0\ 1\ 0 \\ \hline -\ +\ -\ + \end{array} = 0 = \phi_{81}(0)$$

$$\begin{array}{c} 0\ 0\ 1\ 0 \\ 0\ 1\ 0\ 0 \\ \hline +\ -\ -\ + \end{array} \oplus \begin{array}{c} 1\ 1\ 1\ 0 \\ 0\ 1\ 1\ 1 \\ \hline -\ +\ +\ - \end{array} = 0 = \phi_{32}(0)$$

$$\begin{array}{c} 0\ 0\ 1\ 0 \\ 0\ 0\ 0\ 1 \\ \hline +\ +\ -\ - \end{array} \oplus \begin{array}{c} 1\ 1\ 1\ 0 \\ 1\ 1\ 0\ 1 \\ \hline +\ +\ -\ - \end{array} = 0 = \phi_{42}(0)$$

$$\begin{array}{c} 0\ 0\ 1\ 0 \\ 1\ 0\ 0\ 0 \\ \hline -\ +\ -\ + \end{array} \oplus \begin{array}{c} 1\ 1\ 1\ 0 \\ 0\ 1\ 0\ 0 \\ \hline -\ +\ -\ + \end{array} = 0 = \phi_{52}(0)$$

-continued
APPENDIX A $$\begin{array}{c} 0\ 0\ 1\ 0 \\ 0\ 0\ 1\ 0 \\ \hline +\ +\ +\ + \end{array} \oplus \begin{array}{c} 1\ 1\ 1\ 0 \\ 0\ 0\ 0\ 1 \\ \hline -\ -\ -\ - \end{array} = 0 = \phi_{62}(0)$$

$$\begin{array}{c} 0\ 0\ 1\ 0 \\ 0\ 1\ 0\ 0 \\ \hline +\ -\ -\ + \end{array} \oplus \begin{array}{c} 1\ 1\ 1\ 0 \\ 1\ 0\ 0\ 0 \\ \hline +\ -\ -\ + \end{array} = 0 = \phi_{72}(0)$$

$$\begin{array}{c} 0\ 0\ 1\ 0 \\ 0\ 0\ 0\ 1 \\ \hline +\ +\ -\ - \end{array} \oplus \begin{array}{c} 1\ 1\ 1\ 0 \\ 0\ 0\ 1\ 0 \\ \hline -\ -\ +\ + \end{array} = 0 = \phi_{82}(0)$$

$$\begin{array}{c} 0\ 1\ 0\ 0 \\ 0\ 0\ 0\ 1 \\ \hline +\ -\ +\ - \end{array} \oplus \begin{array}{c} 0\ 1\ 1\ 1 \\ 1\ 1\ 0\ 1 \\ \hline -\ +\ -\ + \end{array} = 0 = \phi_{43}(0)$$

$$\begin{array}{c} 0\ 1\ 0\ 0 \\ 1\ 0\ 0\ 0 \\ \hline -\ -\ +\ + \end{array} \oplus \begin{array}{c} 0\ 1\ 1\ 1 \\ 0\ 1\ 0\ 0 \\ \hline +\ +\ -\ - \end{array} = 0 = \phi_{53}(0)$$

$$\begin{array}{c} 0\ 1\ 0\ 0 \\ 0\ 0\ 1\ 0 \\ \hline +\ -\ -\ + \end{array} \oplus \begin{array}{c} 0\ 1\ 1\ 1 \\ 0\ 0\ 0\ 1 \\ \hline +\ -\ -\ + \end{array} = 0 = \phi_{63}(0)$$

$$\begin{array}{c} 0\ 1\ 0\ 0 \\ 0\ 1\ 0\ 0 \\ \hline +\ +\ +\ + \end{array} \oplus \begin{array}{c} 0\ 1\ 1\ 1 \\ 1\ 0\ 0\ 0 \\ \hline -\ -\ -\ - \end{array} = 0 = \phi_{73}(0)$$

$$\begin{array}{c} 0\ 1\ 0\ 0 \\ 0\ 0\ 0\ 1 \\ \hline +\ -\ +\ - \end{array} \oplus \begin{array}{c} 0\ 1\ 1\ 1 \\ 0\ 0\ 1\ 0 \\ \hline +\ -\ +\ - \end{array} = 0 = \phi_{83}(0)$$

$$\begin{array}{c} 0\ 0\ 0\ 1 \\ 1\ 0\ 0\ 0 \\ \hline -\ +\ +\ - \end{array} \oplus \begin{array}{c} 1\ 1\ 0\ 1 \\ 0\ 1\ 0\ 0 \\ \hline -\ +\ +\ - \end{array} = 0 = \phi_{54}(0)$$

$$\begin{array}{c} 0\ 0\ 0\ 1 \\ 0\ 0\ 1\ 0 \\ \hline +\ +\ -\ - \end{array} \oplus \begin{array}{c} 1\ 1\ 0\ 1 \\ 0\ 0\ 0\ 1 \\ \hline -\ -\ +\ + \end{array} = 0 = \phi_{64}(0)$$

$$\begin{array}{c} 0\ 0\ 0\ 1 \\ 0\ 1\ 0\ 0 \\ \hline +\ -\ +\ - \end{array} \oplus \begin{array}{c} 1\ 1\ 0\ 1 \\ 1\ 0\ 0\ 0 \\ \hline +\ -\ +\ - \end{array} = 0 = \phi_{74}(0)$$

$$\begin{array}{c} 0\ 0\ 0\ 1 \\ 0\ 0\ 0\ 1 \\ \hline +\ +\ +\ + \end{array} \oplus \begin{array}{c} 1\ 1\ 0\ 1 \\ 0\ 0\ 1\ 0 \\ \hline -\ -\ -\ - \end{array} = 0 = \phi_{84}(0)$$

$$\begin{array}{c} 1\ 0\ 0\ 0 \\ 0\ 0\ 1\ 0 \\ \hline -\ +\ -\ + \end{array} \oplus \begin{array}{c} 0\ 1\ 0\ 0 \\ 0\ 0\ 0\ 1 \\ \hline +\ -\ +\ - \end{array} = 0 = \phi_{65}(0)$$

$$\begin{array}{c} 1\ 0\ 0\ 0 \\ 0\ 1\ 0\ 0 \\ \hline -\ -\ +\ + \end{array} \oplus \begin{array}{c} 0\ 1\ 0\ 0 \\ 1\ 0\ 0\ 0 \\ \hline -\ -\ +\ + \end{array} = 0 = \phi_{75}(0)$$

$$\begin{array}{c} 1\ 0\ 0\ 0 \\ 0\ 0\ 0\ 1 \\ \hline -\ +\ +\ - \end{array} \oplus \begin{array}{c} 0\ 1\ 0\ 0 \\ 0\ 0\ 1\ 0 \\ \hline +\ -\ -\ + \end{array} = 0 = \phi_{85}(0)$$

$$\begin{array}{c} 0\ 0\ 1\ 0 \\ 0\ 1\ 0\ 0 \\ \hline +\ -\ -\ + \end{array} \oplus \begin{array}{c} 0\ 0\ 0\ 1 \\ 1\ 0\ 0\ 0 \\ \hline -\ +\ -\ + \end{array} = 0 = \phi_{76}(0)$$

$$\begin{array}{c} 0\ 0\ 1\ 0 \\ 0\ 0\ 0\ 1 \\ \hline +\ +\ -\ - \end{array} \oplus \begin{array}{c} 0\ 0\ 0\ 1 \\ 0\ 0\ 1\ 0 \\ \hline +\ +\ -\ - \end{array} = 0 = \phi_{86}(0)$$

$$\begin{array}{c} 0\ 1\ 0\ 0 \\ 0\ 0\ 0\ 1 \\ \hline +\ -\ +\ - \end{array} \oplus \begin{array}{c} 1\ 0\ 0\ 0 \\ 0\ 0\ 1\ 0 \\ \hline -\ +\ -\ + \end{array} = 0 = \phi_{87}(0)$$

I claim:

1. An orthogonal code division multiple access communications system comprising:
   a plurality of transceivers;
   each said transceiver including means for generating and detecting first and second signals to form a pair of corresponding signals;
   all said signals being noise coded;
   all said first signals being orthogonal with respect to all said second signals;
   all of said signals having an autocorrelation function which compresses to an impulse at a common time;
   said autocorrelation function of said first signals being substantially equal and opposite to said autocorrelation function of said corresponding second signal at times other than said common time; and
   each said first signal having a crosscorrelation function with respect to all other of said first signals that is equal and opposite to the crosscorrelation function of the corresponding second signal with respect to all other corresponding second signals at said common time.

2. The communications system as defined by claim 1 wherein said noise coded signals comprise code mate pairs of multi-bit binary digital signals.

3. The communications system as defined by claim 1 wherein said generating means comprises first and second digital code generators operable to generate a pair of multi-bit digital signals and said detecting means comprises first and second autocorrelation detectors.

4. The system as defined by claim 1 wherein
   said generating means comprises a plurality of code generators for generating a code mate pair, multiplexer means coupled to said code generators for multiplexing said code mate pair, transmitter means coupled to said multiplexer means, and
   said detecting means comprises, receiver means coupled to said transmitter means, demultiplexer means coupled to said receiver means, means coupled to said demultiplexer means for providing an impulse autocorrelation output signal.

5. The system as defined by claim 4 wherein said means for providing an impulse autocorrelation output signal comprises autocorrelation detector means for each code of said demultiplexed code mate pair received and linear adder means for providing a composite impulse output signal.

6. An orthogonal code division multiple access communication system, including a plurality of users comprising in combination:
   a plurality of transceivers utilized by said users and being simultaneously operable during the same time period with different multiplexed noise codes which compress to an impulse upon autocorrelation and additionally having crosscorrelation functions equal to zero at a time when said noise codes autocorrelate to an impulse.

7. The system as defined by claim 6 wherein said noise codes consist of code mate pairs having autocorrelation functions upon detection which when linearly added together compress to a lobeless impulse.

8. The system as defined by claim 6 wherein each of said transceivers include,
   a plurality of code generators for generating said code mate pairs,
   multiplexer means coupled to said code generators for multiplexing said code mate pairs of said noise codes,
   transmitter means coupled to said multiplexer means,
   receiver means coupled to said transmitter means,
   demultiplexer means coupled to said receiver means, and
   means coupled to said demultiplexer means for providing an impulse autocorrelation output signal.

9. The system as defined by claim 8 wherein said means for providing an impulse autocorrelation output signal comprises an autocorrelation detector.

10. The system as defined by claim 8 wherein said means for providing an impulse autocorrelation output comprises pulse compressor means.

11. The system as defined by claim 8 wherein said means for providing an impulse autocorrelation output comprises a matched filter.

12. The system as defined by claim 8 wherein said means for providing an impulse autocorrelation output comprises a pair of adder circuit means, a plurality of time delay circuit means for successively delaying the application of received coded pulses to input terminals of said adders by one interval of time each, wherein multiple intervals of time comprise said time period, and a plurality of phase control circuits for reversing the polarities of selected code pulses applied at said input terminals in accordance with the predetermined code pattern of said coded pulses.

13. The system as defined by claim 12 and wherein sequential ones of said phase control circuits provide a phase reversal of 0° or 180° in inverse relationship to the sequence of said coded pulses received.

14. The system as defined by claim 6 and additionally including a central node station, and
   wherein each said transceiver communicates with another of said transceivers through said central node station.

15. The system as defined by claim 14 wherein each of said transceiver means includes means for transmitting said noise codes on carrier signals of a first carrier frequency to said central node station,
   wherein said central node station includes carrier frequency translation means for retransmitting said noise codes on a second carrier frequency signal, and
   wherein each of said transceiver means includes means responsive to said second carrier frequency for detecting said noise codes.

16. The system as defined by claim 15 wherein each of said transceiver means includes,
   said plurality of code generators for generating code mate pairs,
   multiplexer means coupled to said code generators for multiplexing said code mate pairs,
   transmitter means coupled to said multiplexer means,
   receiver means coupled to said transmitter means,
   demultiplexer means coupled to said receiver means, and
   autocorrelation detector means coupled to said demultiplexer means for providing an impulse output signal.

17. The system as defined by claim 16 and additionally including means for synchronizing the arrival and retransmission of all said noise codes from said central node station during said same time period, said time period comprising a time required for transmitting one of said code mate pairs.

18. The system as defined by claim 17 wherein each code mate pair comprises a multi-bit code transmitted in equal time increments of a common time slot or period.

19. The system as defined by claim 17 wherein said synchronizing means comprises,
means in said central node station for generating and transmitting a reference frequency signal to each of said transceiver means,
and wherein each transceiver includes voltage controlled oscillator means in said transmitter means,
phase comparison means in said receiver means responsive to said reference frequency signal and said second carrier frequency signal from said central node station to provide a control voltage to said oscillator means for locking said oscillator means of the respective transmitter means to said reference frequency transmitted from said central node station.

20. The system as defined by claim 18 wherein each transceiver means additionally includes time discriminator means in said receiver means for generating said control voltage for said voltage controlled oscillator.

21. A method of communicating with a plurality of transceivers comprising the steps of:
generating first and second electrical signals in each transceiver to form a pair of said signals;
said pair of signals being noise coded and mutually different;
all said first signals being orthogonal with respect to all said second signals;
all of said signals having an autocorrelation function which compresses to an impulse at a common time;
said autocorrelation function of said first signals being substantially equal and opposite to said autocorrelation function of said corresponding second signal at times other than said common time;
each said first signal having a crosscorrelation function with respect to all other of said first signals that is equal and opposite to the crosscorrelation function of the corresponding second signal with respect to all other corresponding second signals at said common time;
transmitting said pair of noise coded signals to other of said transceivers at said common time;
at least one of said other transceivers receiving and detecting a pair of said noise coded signals transmitted at said common time;
autocorrelating the detected pair of noise coded signals to provide a pair of impulse signals which may contain sidelobes; and
linearly adding the impulse signals whereby any sidelobes present are cancelled to thereby provide a lobeless output signal.

* * * * *